UNITED STATES PATENT OFFICE.

PHILIP DREESBACH, OF NEW YORK, N. Y., ASSIGNOR TO CORN PRODUCTS REFINING COMPANY, OF NEW YORK, N. Y., A CORPORATION OF NEW JERSEY.

DEPULVERIZATION OF STARCH AND THE LIKE.

1,186,893.          Specification of Letters Patent.     Patented June 13, 1916.

No Drawing.      Application filed March 30, 1915. Serial No. 18,140.

*To all whom it may concern:*

Be it known that I, PHILIP DREESBACH, a citizen of the United States, residing at New York, in the county of New York and State of New York, have invented certain new and useful Improvements in the Depulverization of Starch and the like, of which the following is a specification.

This invention relates to the depulverization of starch and similar powders, and its novelty consists in the successive steps of the process employed and in the resulting product.

In fermentation industries and especially in the art of brewing, starch is employed in the form of powder and it is necessary to transmit it from one part of a plant to another in cloth bags, bucket elevators, or some other form of conveyer. The necessary agitation of the mass of powder in such transference results not only in a loss of material and the expenditure of labor to clean it up, but also in the production of clouds of dust which are annoying to those brought into contact therewith. A means has long been sought in this art to prevent such dusting and there are of course other industries in which starch or similar powders are conveyed and in which similar clouds of dust are produced with the same disadvantageous and annoying results.

The object of my invention is to so treat the starch powder as to convert it from the finely divided state of powder to a form in which it exists in lumps or pieces of sufficient size not easily to be converted into dust. To that end, the starch powder in any convenient quantity, or the starch in a moist condition before it is converted into a powder, is subjected to contact with a suitable binding material in solution. Of course in an industry in which the resulting product is to be introduced into the human system as a beverage, the binding material must be of such a nature as to be readily assimilable and noninjurious. In the beer brewing industry, for instance, it may be any suitable mucilaginous, albuminous, gelatinous, dextrinous, dextrose or sucrose material, such as might in itself be used as a brewing material. There are three materials which I have found in practice to be equally well adapted for this purpose and any one of them may be employed, the principle of their use being identical. The first of these is liquid commercial glucose which is probably the most suitable as it is the cheapest; the second is cane sugar, and the third is dextrin. In practice, when I use glucose, I make a binding solution by diluting the commercial liquid to a density of about one half its usual density so that it is thin enough to be used as a spray. If I use cane sugar or dextrin, I make a solution in water in the proportion of about ten pounds of dextrin or sugar to about ninety pounds of the solid starch to be treated, and then add sufficient water to make a fairly thick paste or stiff batter when the ingredients are brought together.

The binding solution is added to the starch in any suitable manner. A simple method to be employed where it is desired to use hand labor and the quantity to be handled is not sufficient to warrant the employment of molds, is to mix the starch and the binding solution in a vat to a stiff batter, place the batter in a suitable container like a metallic or wooden tray, remove the moisture by subjecting the same to the action of heat in a suitable kiln or oven, until a block of the material is formed and then break up the material into lumps in any suitable way. If there is sufficient quantity to be treated to warrant the employment of machinery, the method which I prefer to employ is to place the powder in suitable receptacles upon an endless conveyer which is caused to travel beneath a spraying device supplied with the binding material from a suitable reservoir so that the spray falls upon the mass of powder in the receptacles. The conveyer is then caused to be moved through a dehydrating apparatus, preferably in the form of an oven in which the water is removed by evaporation and the receptacles are then removed from the conveyer, their contents dumped out upon a suitable surface and the material broken up into lumps. Another method which may be employed is to mix the powder with the binder to a batter in an apparatus similar to a dough-mixer used in the art of baking and then thin this batter to such a condition that it can be allowed to run through a slotted, perforated or otherwise foraminous container upon a belt conveyer.

I claim:

1. The process of agglutinating starch and similar dusty powders which consists in mixing the powder with a suitable quantity of a binder that will act upon the powder to produce a solid mass, said binder being in solution, thereby forming a paste, removing the moisture until a cake is formed and breaking up the latter into lumps.

2. The process of treating starch powder which consists in mixing with it a solution of a binder which will operate with it to form a solid mass and is not injurious to the human body taken internally, until a paste mixture is formed, drying the paste to form a solid mass and breaking the same into lumps.

3. The process of treating starch powder which consists in mixing with it glucose diluted with a suitable fluid as water until a dough-like mass is formed, drying the latter by heat and forming a solid mass, and breaking up the mass into pieces.

4. The process of treating starch powder which consists in mixing with it a watery solution of sugar or like substance in the proportion of about one part of said solid substance to nine parts solid starch, drying the mixture to remove the water and breaking up the mass.

5. The process of treating starch and similar substances in powdered form, which consists in mixing such powdered substance with a binder in solution to cause the adhesion of the powder into a solid mass, molding the mixture while the same is in plastic condition, drying the molded mass, and breaking the molded and dried mass up into fragments.

6. The process of producing a substantially dust-free starch product in the form of fragments, which consists in mixing starch with a soluble binder when said binder is in solution, drying the mixture, and dividing the latter into a substantially dustless mass of fragments.

7. The process of producing a substantially dust-free starch product in the form of fragments, which consists in mixing starch with a soluble binder composed of a substance derived from starch by conversion, drying the mixture and dividing the dried mixture into a substantially dustless mass of fragments.

8. The process of producing a substantially dust-free starch product in the form of fragments, which consists in mixing substantially ungelatinized starch with a soluble binder when said binder is in solution, drying the mixture, and dividing the latter into a substantially dustless mass of fragments.

9. The process of producing a substantially dust-free starch product in the form of fragments, which consists in mixing substantially ungelatinized starch with a soluble binder composed of a substance derived from starch by conversion, drying the mixture and breaking the latter into a substantially dustless mass of fragments.

10. The process of producing a substantially dust-free starch product in the form of fragments, which consists in mixing starch powder and a soluble substance derived from starch by conversion when said substance is in solution, drying the mixture into a relatively hard body, and breaking such body into a substantially dustless mass of fragments that are relatively hard, but which break down in water at usual mashing temperatures.

In testimony whereof I affix my signature in presence of two witnesses.

PHILIP DREESBACH.

Witnesses:
ALDA L. MILLER,
MARY H. LEWIS.